Figure 1:
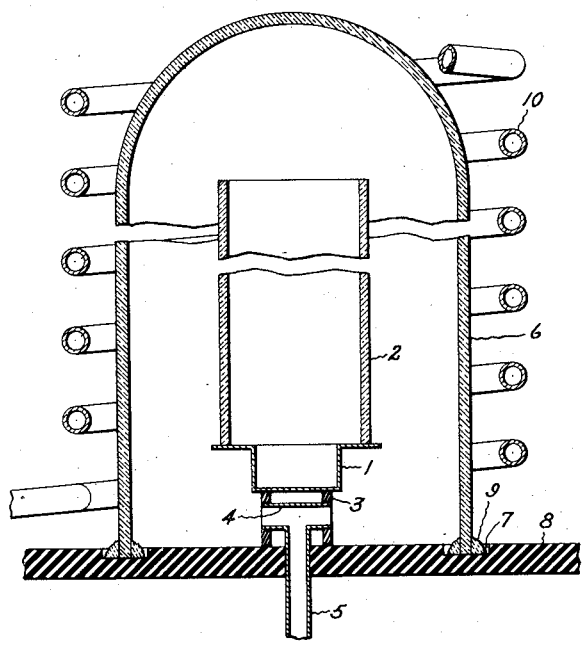

July 21, 1936.  E. D. McARTHUR  2,048,556

GLASS-TO-METAL SEAL

Filed Jan. 4, 1934

Inventor:
Elmer D. McArthur,
by Harry E. Dunham
His Attorney.

Patented July 21, 1936

2,048,556

UNITED STATES PATENT OFFICE 2,048,556

GLASS-TO-METAL SEAL

Elmer D. McArthur, Schenectady, N. Y., assignor to General Electric Company, a corporation of New York Application January 4, 1934, Serial No. 705,251

2 Claims. (Cl. 49—81)

The present invention relates to processes for making seals between glass and metal. In the fabrication of vacuum tube apparatus, lamps, etc., it frequently becomes necessary to seal metal to glass, as for example, when glass and metal cylinders are joined together or when passing a leading-in conductor through a glass press or when supporting electrodes or conductors within a metal envelope by means of glass insulators. Such a seal is usually made by holding the metal against or within the glass in any convenient manner, as for example, between rotating heads of a sealing machine, then applying intense heat to both the glass and metal in the region of the joint, usually by means of adjustable cross-fire gas flames, until the glass wets the metal and upon cooling, sticks thereto. In another form of seal, the glass and metal are held together and heated within a gas or electrically fired furnace until the seal is effected.

Various metals, alloys, and metal composites, such as copper, tungsten, chrome iron, copper-coated iron nickel alloys, etc. are used for sealing purposes and if necessary, the configuration or size, or both, of the metal member is designed to reduce the residual strain at the joint to a point below the elastic limit of the glass.

When cross-fires are employed as a source of heat, the glass member obviously is heated as much as the adjacent metal member because the flame, upon striking the joint tends to spread and travel equally in both directions. This heat, in passing through the glass for a considerable distance from the joint weakens the glass or at least may change its composition and give rise to failure of the envelope in the region of the seal. It is well known, of course, that in the case of heating by a gas flame, many variable factors are introduced which do not lend themselves to control, for example, changes in fuel value due to the admixture of foreign material, changes in gas pressure, etc. These factors obviously affect, in a more or less deleterious manner, the quality of the seal. Moreover, the operator of a gas flame has little or no control over the exact position on the joint at which the gas flame strikes, because the flame is not of a localized or concentrated character when it reaches the glass or metal.

The furnace method of sealing, whether gas or electrically fired, is open to the objection that the applied heat cannot be readily controlled, due to the heat absorption of the space within the furnace and of the furnace walls, which introduces considerable lag in the heating effects. Furthermore, it is not possible to control the position on the seal members at which the greatest heating effect should be directed, since obviously, the entire surface of the glass and metal members is subjected to the same oven temperature.

In addition to the objections noted, seals made according to the prior methods also necessitate a great deal of work, not only in preparing the metal to insure a tight joint with the minimum strain, but also in the actual heating operation, particularly when the shape and size of the metal and glass members are not readily adapted to the available apparatus for providing cross-fire heating or furnace treatment. Such a process obviously calls for skilled labor and involves considerable expense in the time of the operator, also in the cost of apparatus necessary for making the seal.

An object of the present invention is to provide an improved process for making a glass-to-metal seal which is not only simple, requiring no skilled labor and which may be carried out rapidly, but also, is readily controllable from the temperature standpoint as well as from the standpoint of heating one portion of the sealed members more than another portion when necessary. The improved process presents no limitations as to size and shape of the joined members and involves no costly apparatus for making the seal. This object is attained in brief by the use of a high frequency induction coil which may be operated under vacuum conditions or in the air and which may be controlled in such a manner as to inductively heat the metal to a much greater extent than the adjoining glass whereby the initial composition and shape of the glass is substantially maintained even during sealing. Thus the metal constitutes a prolific source of heat which is readily and instantly controllable by the operator and from which heat flows to the glass by conduction and radiation for providing the necessary sealing temperature.

Figure 2:
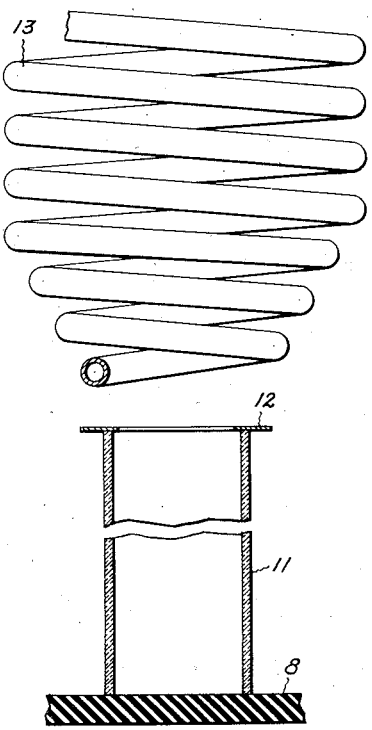
Figure 3:
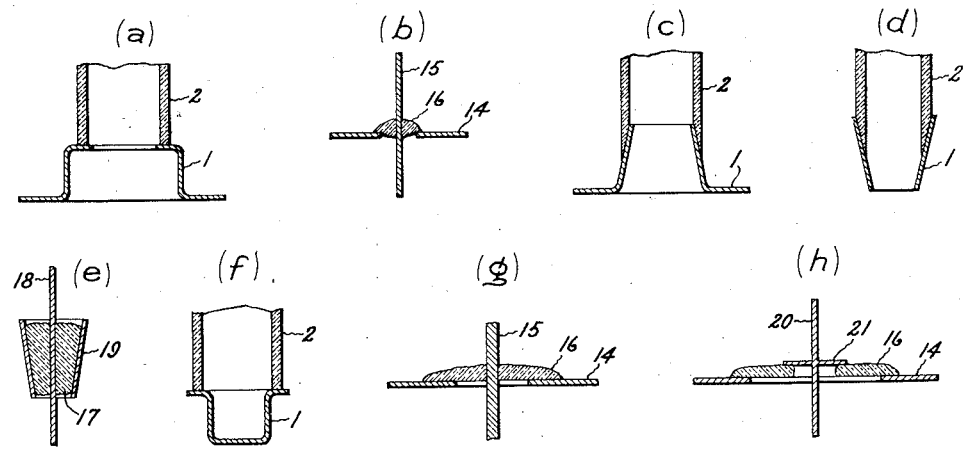

The invention will be better understood when reference is made to the following description and accompanying drawing in which Fig. 1 represents a cross-sectional view of a furnace operated under vacuum and adapted in accordance with the present invention for making glass-to-metal seals; Fig. 2 shows the application of the invention to a sealing process performed in air, while Fig. 3 illustrates by way of exemplification, a number of glass and metal members having widely different configurations and sizes which may be advantageously sealed together by the improved process.

Referring more particularly to Fig. 1, the metal and glass members to be joined together, are designated by the reference characters 1 and 2 respectively. The glass member is typified as an open-ended cylinder which may constitute the envelope of an electron discharge device. The envelope may terminate at one end in the metal member 1, which conveniently may serve as one of the electrodes of the device or simply as a support for an electrode or leading-in conductor. The metal member rests on a platform 3 of insulating material such as asbestos which contains horizontal conduits 4 communicating with a vertical evacuating pipe line 5.

The metal member is illustrated as taking the form of a cap with a large recess at the center and supporting the glass member 2 at the outer edge. The metal member may consist of any metal which is usually employed for sealing purposes, regardless of its thermal coefficient of expansion, when proper allowance in the design and size of the member is made for the difference in its coefficient of expansion with respect to that of the joined glass. It is of course essential that the residual strain at the joint shall be less than the elastic limit of the glass in order to preclude strain cracks and eventual leakage. While any metal may be employed under certain conditions for making the seal, I prefer to employ a metal or alloy which has a thermal coefficient of expansion exactly matching that of the glass to which it is joined, from room temperature up to and including the softening temperature of the glass. It is apparent that in such a case, no residual strain whatever is introduced into the glass during fabrication of the seal and hence no limitations as to size, thickness or configuration of the metal member are necessary. Such an alloy has been disclosed and claimed in the Burger and Hull application Serial No. 705,250, filed January 4, 1934, entitled "Glass-to-metal seals," and assigned to the same assignee as the present invention. As stated in the application referred to, the alloy may consist approximately of 18% cobalt (Co), 28% nickel (Ni) and 54% iron (Fe) when the glass is of the approximate composition of 65% silica ($SiO_2$), 23% boric oxide ($B_2O_3$), 7% sodium oxide ($Na_2O$) and 5% aluminum oxide ($Al_2O_3$). Another kind of glass disclosed in said application and having an approximate composition of 65% silica ($SiO_2$), 1% boric oxide ($B_2O_3$), 15% sodium oxide ($Na_2O$), 7% calcium oxide (CaO), 6% zinc oxide (ZnO) and 4% aluminum oxide ($Al_2O_3$), may be sealed without residual strain to an alloy of approximately 25% cobalt (Co), 30% nickel (Ni), 40% iron (Fe) and 5% chromium (Cr), regardless of size, shape or thickness of the alloy. It will of course be understood that the compositions, also the percentages of the glass and alloy elements may be changed within reasonable limits.

The improved process consists in inductively heating the metal portion of the seal, and as shown in Fig. 1, may be advantageously accomplished under vacuum conditions or in the presence of controllable amounts of gas or vapor by placing the metal cap member 1 on the platform 3 with the glass jar removed, then mounting the glass cylinder 2 in place on top of the metal member. The assembled structure is then surrounded by a glass jar 6, closed at the top and which rests in a circular groove 7 provided in the base member 8 of fireproof insulating material such as asbestos. The jar 6 is hermetically sealed at the bottom in a temporary manner by waxy material 9 into which the jar is pressed down while the wax is in a plastic state.

The interior of the jar is then evacuated through the pipe 5 to the desired degree of vacuum, and the optional gas or vapor admitted in any well-known and suitable manner after which a helical coil 10, preferably made of hollow copper tubing, of a size sufficient entirely to surround the jar 6 is placed about the jar. When current of suitably high frequency is supplied to the coil 10 from a source (not shown), magnetic lines of force are set up within the jar, which are intercepted by the metal member 1 and induce currents therein. These currents heat the metal member up to any desired temperature, depending upon the frequency and magnitude of the current flowing through the coil 10, also the spacing between the coil and the metal member. The current through the coil may be regulated by a rheostat or in any other suitable manner, as may also the frequency of the current, so that the temperature to which the metal member is heated may be externally controlled. In order to maintain the coil 10 as cool as possible, water or other cooling fluid may be forced through the interior of the hollow tubing.

When the desired temperature of the metal member 1 is reached by proper control of the frequency and current flowing through the coil 10, it will be found that the heat communicated to the glass member 2 by conduction and radiation from the metal member 1 is sufficient to cause the glass to soften and wet the metal and to provide a hermetic seal at the joint between the two members. In case an alloy of the kind specifically referred to hereinbefore is used for the metal member, the joint will be entirely strain-free upon cooling while in the case of other metals or alloys and with the proper design of the metal member, the strains may be kept below the elastic limit of the glass.

The temperature of the joined members may be lowered to room temperature by removing the coil and the jar 6, or if desired, the temperature may be reduced at any desired rate by controlling the frequency of the current in the coil 10 or the current magnitude, or the position of the coil with respect to the joined members.

Inasmuch as the glass member 2 has an extremely high resistance and contains only a limited amount of metallic salts, the coil 10 will cause little or no heating of the glass but will concentrate the heating effects in the metal member 1. The heat which is necessary to wet the metal by the glass does not extend very far into the glass from the position of the joint and consequently does not change the composition or shape of the glass to any great extent. The process is exceedingly simple in that it calls for no other apparatus than a high frequency coil except in the case of a vacuum, gas or vapor treatment in which a standard vacuum jar and pumping equipment are used. The different steps employed in the process are so simple that a person, regardless of skill in the glass-sealing art, may perform them satisfactorily, after very little instruction. No complicated arrangement, such as gas cross-fires or elaborate equipment, such as gas or electrically heated ovens, is necessary. Moreover, none of the variable factors which attend the use of gas are present in the high frequency electrical treatment because obviously in the latter, the only conditions involved are those of frequency and current magnitude both of which can be readily controlled and held within narrow limits by the use of well-known controlling and indicating devices. Consequently, it is possible to make such seals with much greater uniformity than is possible with methods heretofore used.

Fig. 2 depicts a method of sealing metal to glass in air. The glass member 11 is again typified as taking the form of a cylinder upon which rests a washer 12 of any suitable metal which is to be hermetically sealed to the glass. A high frequency coil 13 constituted of copper tubing and preferably cooled by a circulating fluid may be brought into a position with respect to the metal washer as to induce currents therein and to provide sufficient heat which will cause the glass to wet the metal and form a hermetic seal. The high frequency coil in this case is shown as of a tapered configuration at the bottom and in its ordinary use, only the end turn of small diameter need be brought into the region of the metal washer. The heating position may be similar to that shown in the figure, although it will be understood that if desired, the entire coil may be of a sufficient size entirely to surround the glass and metal members.

Fig. 3 shows a number of seals of different types which may be made with equal facility by the high frequency induction method, either under vacuum, gas or vapor conditions as illustrated in Fig. 1 or directly in the air as shown in Fig. 2. Thus in the modification (a), the metal member 1 may take the form of a cap member provided with a central opening and the glass member 2 hermetically sealed to a peripheral portion of the cap member. In modification (b), numeral 14 designates a metal plate which may constitute part of a metal envelope, while numeral 15 designates a conductor which it is desired to be insulatingly supported from the metal plate by means of the glass mass 16. A hermetic seal may be conveniently made between the glass member 16 and the metal members 14 and 15 by the high frequency method explained hereinbefore. In the modification (c), the metal member 1 takes the form of a cap provided with a conical top piece to which the glass cylinder 2 is readily sealed. Modification (d) shows still another form in which the metal member 1 is of conical form and the glass cylinder 2 is sealed at the upper edge and on the interior surface of the metal member. In modification (e), the mass of glass 17 is hermetically sealed between the conductor 18 and the metal conical member 19. Modification (f) shows a cap member similar to that described with respect to Fig. 1 except that the cap member is of a different size and shape and has rounded edges. Modification (g) shows a seal which is somewhat similar to that illustrated in modification (b) except for the size of the conductor 15 and the opening in the metal plate member 14 which necessitates a glass mass of different configuration from that shown in modification (b). Modification (h) shows a seal between metal and glass which is a variant of that shown in modifications (b) and (g) in that the central conductor 20 is now provided with a disk 21 which is hermetically sealed to the glass mass 16 which in turn, is also hermetically sealed to the metal plate 14. While I have shown only a few of the possible configurations of the glass and metal members which may be hermetically joined together in accordance with my improved high frequency process, it will be understood that many other shapes of joined members and many different sizes thereof may be satisfactorily sealed, since obviously my process has no limitations whatever as to size or shape provided a sufficiently high frequency, also magnitude of current in the coil as well as size of coil is available to provide the necessary sealing temperature to the metal member.

The simplicity and adaptability of the improved sealing process to metal and glass members of all shapes and sizes are in marked contrast to the complexities and limitations of the prior methods. As stated hereinbefore, these prior methods not only involve complicated apparatus such as cross-fires, ovens, sealing machines, etc., the sealing effects of which are not readily controllable but their operation in addition, becomes increasingly difficult and tedious as the configuration and size of the joined members depart from standard seals of ordinary type and size.

What I claim as new and desire to secure by Letters Patent of the United States, is:

1. In the art of sealing glass to metal, the method which consists in positioning a glass and metal member in abutting relation in such a manner that the only forces acting at the joint are substantially those due to gravity, heating the metal member by induction, a portion of the generated heat flowing by conduction through the abutting surfaces to melt the glass and to cause fusion of the glass with the metal member due to said gravitational forces.

2. In the art of sealing a glass member to a metal member, each having a substantially flat sealing surface substantially normal to the major axis of the respective members, the method which consists in positioning the members in a substantially vertical plane with the sealing surfaces in abutting relation so that the weight of one of the members constitutes a force pressing the members together, then heating the metal member by induction to produce heat at the sealing surfaces to cause the glass to wet the metal against which it is pressed.

ELMER D. McARTHUR.